US012673630B2

(12) United States Patent (10) Patent No.: US 12,673,630 B2
Gutierrez et al. (45) Date of Patent: Jul. 7, 2026

(54) VEHICLE SYSTEM

(71) Applicant: GM Global Technology Operations LLC, Detroit, MI (US)

(72) Inventors: Michael Andrew Gutierrez, Dearborn Heights, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/392,660

(22) Filed: Dec. 21, 2023

(65) Prior Publication Data

US 2025/0206252 A1 Jun. 26, 2025

(51) Int. Cl.
*B60R 21/12* (2006.01)
*B60R 1/23* (2022.01)
*B60R 21/015* (2006.01)

(52) U.S. Cl.
CPC .............. *B60R 21/12* (2013.01); *B60R 1/23* (2022.01); *B60R 21/01546* (2014.10); *B60R 21/0155* (2014.10)

(58) Field of Classification Search
CPC .......... H04W 4/80; H04W 4/90; G05B 19/00; G05B 19/042; G05B 19/0428; G07C 9/00; B60L 58/12; B60Q 1/00; B60N 2/00; B60N 2/267; B60N 2/268; B60R 25/10; B60R 25/25; B60R 25/30; B60R 25/31

See application file for complete search history.

(56) References Cited

U.S. PATENT DOCUMENTS

| | | | | |
|---|---|---|---|---|
| 12,227,103 | B1 * | 2/2025 | Lerner | B60L 58/12 |
| 2010/0302022 | A1 * | 12/2010 | Saban | B60N 2/268 |
| | | | | 340/459 |
| 2019/0215672 | A1 * | 7/2019 | Orris | B60H 1/00742 |
| 2019/0279447 | A1 * | 9/2019 | Ricci | B60R 25/01 |
| 2020/0290567 | A1 * | 9/2020 | Funyak | B60R 25/102 |

* cited by examiner

*Primary Examiner* — Van T Trieu

(74) *Attorney, Agent, or Firm* — Honigman LLP; Matthew H. Szalach

(57) ABSTRACT

A vehicle system for a vehicle includes memory hardware in communication with data processing hardware, the memory hardware storing instructions that when executed on the data processing hardware cause the data processing hardware to perform operations. The operations include determining whether the vehicle is in park, determining whether an occupant is in the vehicle, determining whether a seatbelt of the vehicle is buckled, determining whether there is a potential threat to the vehicle, and if the vehicle is in park, an occupant is in the vehicle, the seatbelt is buckled, and there is a potential threat to the vehicle, activating defensive measures.

20 Claims, 4 Drawing Sheets

VEHICLE SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a vehicle system and in particular to a vehicle system having defense mode capabilities and components.

Police officers and other first responders play a critical role in ensuring public safety. Generally speaking, police officers are responsible for enforcing local and state laws and often are required to confront criminals in an effort to stop criminal activity. In so doing, police officers are often placed in dangerous situations requiring the officers to respond quickly to potential threats to their person and/or to other members of the community.

Enforcing local and state laws often requires police officers to travel from a police station to the scene of a crime or disturbance. Further, when police officers are not responding to a particular crime or disturbance, police officers typically patrol a city or township in which the police officer is stationed. For example, police officers may patrol a city or township on foot or in a police vehicle. Such vehicles include police cruisers or cars, motorcycles, Segway® scooters, or horses. When on patrol, a police officer may encounter a criminal, criminal activity, or other situation where the police officer is required to quickly respond in an effort to stop criminal activity or to otherwise aid a member of the community.

Regardless of whether a police officer is dispatched from a police station to assist in a particular crime at a particular location or happens upon such a situation when out on patrol, police officers must be able to act quickly upon arrival at a crime scene, when confronting a potential criminal, or when otherwise aiding a member of the community. While conventional police cruisers allow for a police officer to travel from a police station to the scene of a crime, pursue a criminal, and generally provide the police officer with a myriad of resources such as one or more computer systems, radios, weapons, and ammunition to name a few, police cruisers are not typically responsive to a surrounding environment. Accordingly, and in certain circumstances, safety and other systems of a conventional police cruiser may restrict police officers from reacting as quickly as possible.

For example, when a police officer arrives at the scene of a crime and needs to quickly exit a police cruiser, a seatbelt of the police cruiser may be secured to the police officer. The seatbelt may increase the time it takes for the police officer to exit the police cruiser by requiring the police officer to first unlatch and remove the seatbelt. Accordingly, a need exists for a police cruiser or other emergency vehicle to be responsive to the needs of a police officer or other first responder to ensure that the police officer or first responder is able to respond to an emergency situation as quickly as possible.

SUMMARY

A vehicle system for a vehicle includes memory hardware in communication with data processing hardware, the memory hardware storing instructions that when executed on the data processing hardware cause the data processing hardware to perform operations. The operations include determining whether the vehicle is in park, determining whether an occupant is in the vehicle, determining whether a seatbelt of the vehicle is buckled, determining whether there is a potential threat to the vehicle, and if the vehicle is in park, an occupant is in the vehicle, the seatbelt is buckled, and there is a potential threat to the vehicle, activating defensive measures.

The vehicle system may include one or more of the following optional features. For example, the defensive measures may include deactivating a seatbelt pre-tensioner, projecting vehicle surroundings on a display within the vehicle, and deploying armor. Projecting vehicle surroundings on the display may include displaying images and/or video from one or more cameras associated with the vehicle. Deploying armor may include positioning a shield over an exterior portion of the vehicle.

In one configuration, determining whether there is a potential threat to the vehicle may include determining whether a siren and/or emergency lights of the vehicle are activated. Further, determining whether there is a potential threat to the vehicle may include determining whether the vehicle is in a high-risk area. Further yet, determining whether there is a potential threat to the vehicle may include determining whether it is nighttime, whether a suspect is approaching the vehicle, or whether a suspect has a criminal record.

A vehicle may incorporate the vehicle system.

In another configuration, a vehicle system for a vehicle includes memory hardware in communication with data processing hardware, the memory hardware storing instructions that when executed on the data processing hardware cause the data processing hardware to perform operations. The operations include determining whether the vehicle is in park, determining whether an occupant is in the vehicle, determining whether a seatbelt of the vehicle is buckled or is unbuckled, determining whether a siren and/or emergency lights of the vehicle are activated, determining whether there is a potential threat to the vehicle, and if the vehicle is in park, an occupant is in the vehicle, the seatbelt is buckled, the siren and/or emergency lights are activated, and there is a potential threat to the vehicle, activating expedited exit measures.

The vehicle system may include one or more of the following optional features. For example, the expedited exit measures may include unbuckling a seatbelt, projecting vehicle surroundings on a display within the vehicle, lowering the vehicle, opening a vehicle door, and deploying armor. Projecting vehicle surroundings on the display may include displaying images and/or video from one or more cameras associated with the vehicle.

In one configuration, determining whether there is a potential threat to the vehicle may include determining whether the vehicle is in a high-risk area. Further, determining whether there is a potential threat to the vehicle may include determining whether it is nighttime. Further yet, determining whether there is a potential threat to the vehicle may include determining whether a suspect is approaching the vehicle or whether a suspect has a criminal record.

A vehicle may incorporate the vehicle system.

In yet another configuration, a vehicle system for a vehicle includes memory hardware in communication with data processing hardware, the memory hardware storing instructions that when executed on the data processing hardware cause the data processing hardware to perform operations. The operations include determining whether the vehicle is in drive or reverse, determining whether an occupant is in the vehicle, determining whether there is an incoming threat to the vehicle, and if the vehicle is in drive or reverse, an occupant is in the vehicle, and there is an incoming threat to the vehicle, activating defensive measures.

The vehicle system may include one or more of the following optional features. For example, the defensive measures may include deploying armor, sealing a cabin of the vehicle, supplying clean air to the vehicle cabin, and rerouting the vehicle. Further, determining whether there is a potential threat to the vehicle may include determining whether a suspect is approaching the vehicle or whether a suspect has a criminal record.

A vehicle may incorporate the vehicle system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
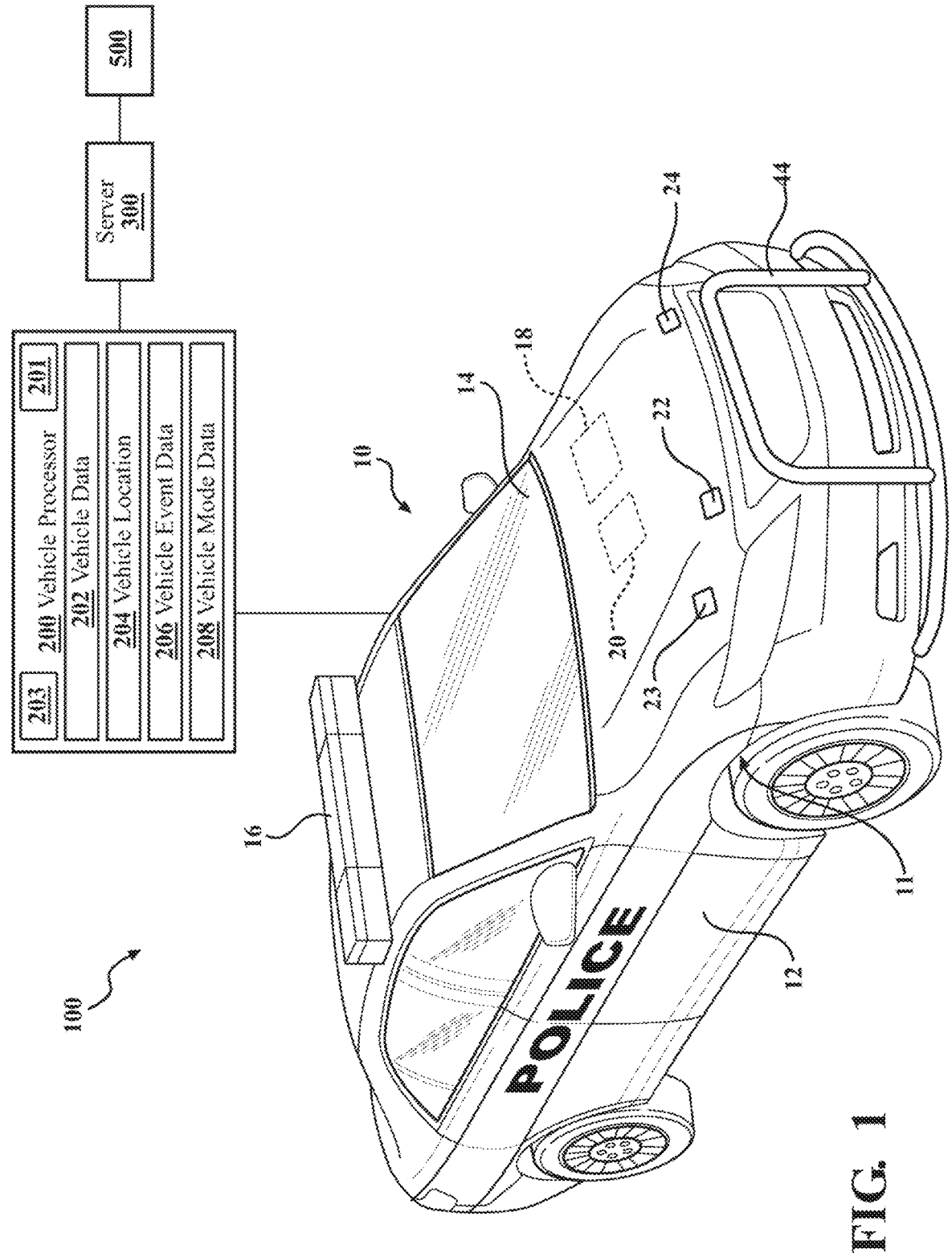
FIG. 1 is a front perspective view of a vehicle incorporating a vehicle system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to"

another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
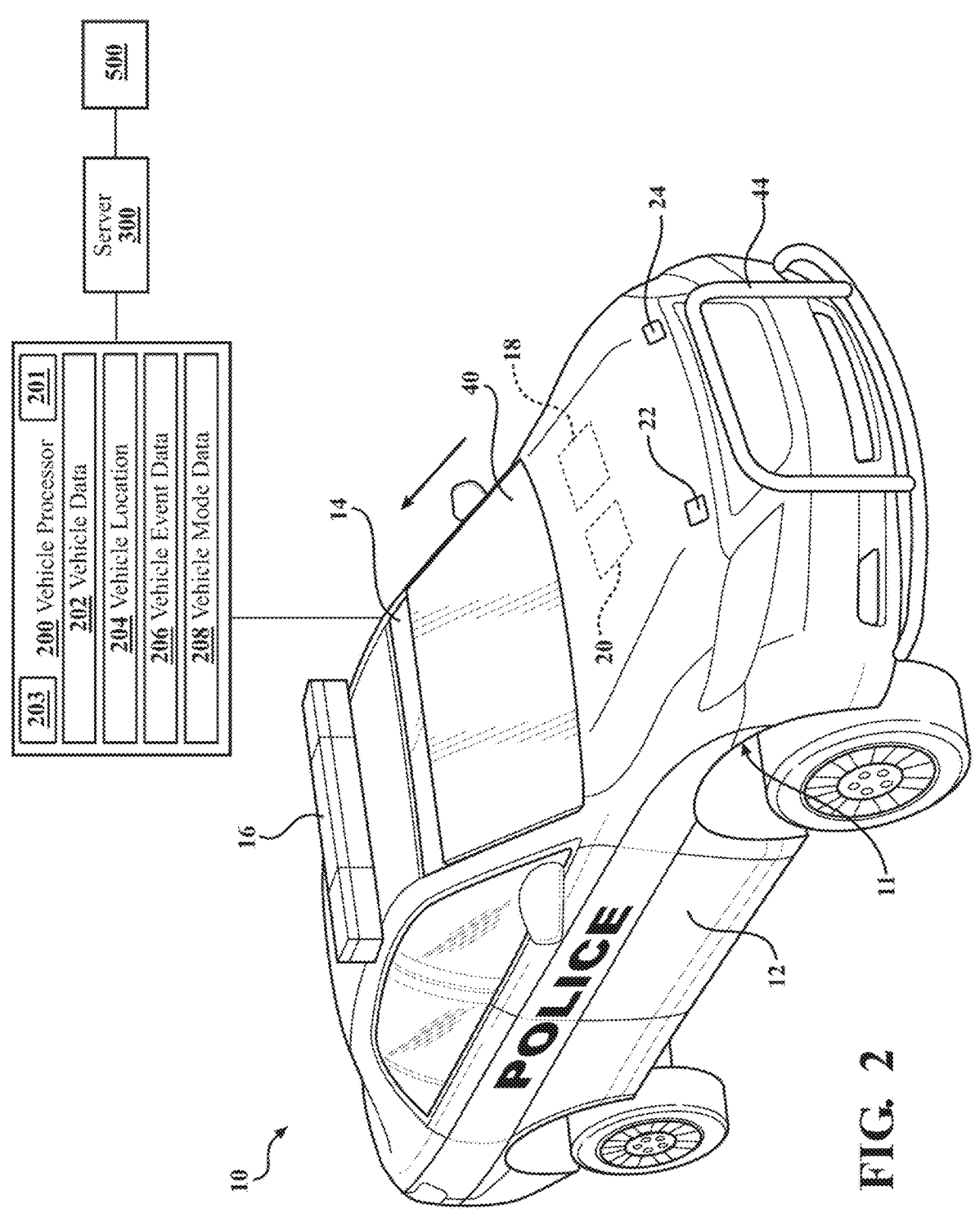
FIG. 2 is a front perspective view of the vehicle of FIG. 1 in a defense mode and including a vehicle system according to the present disclosure.
Figure 3:
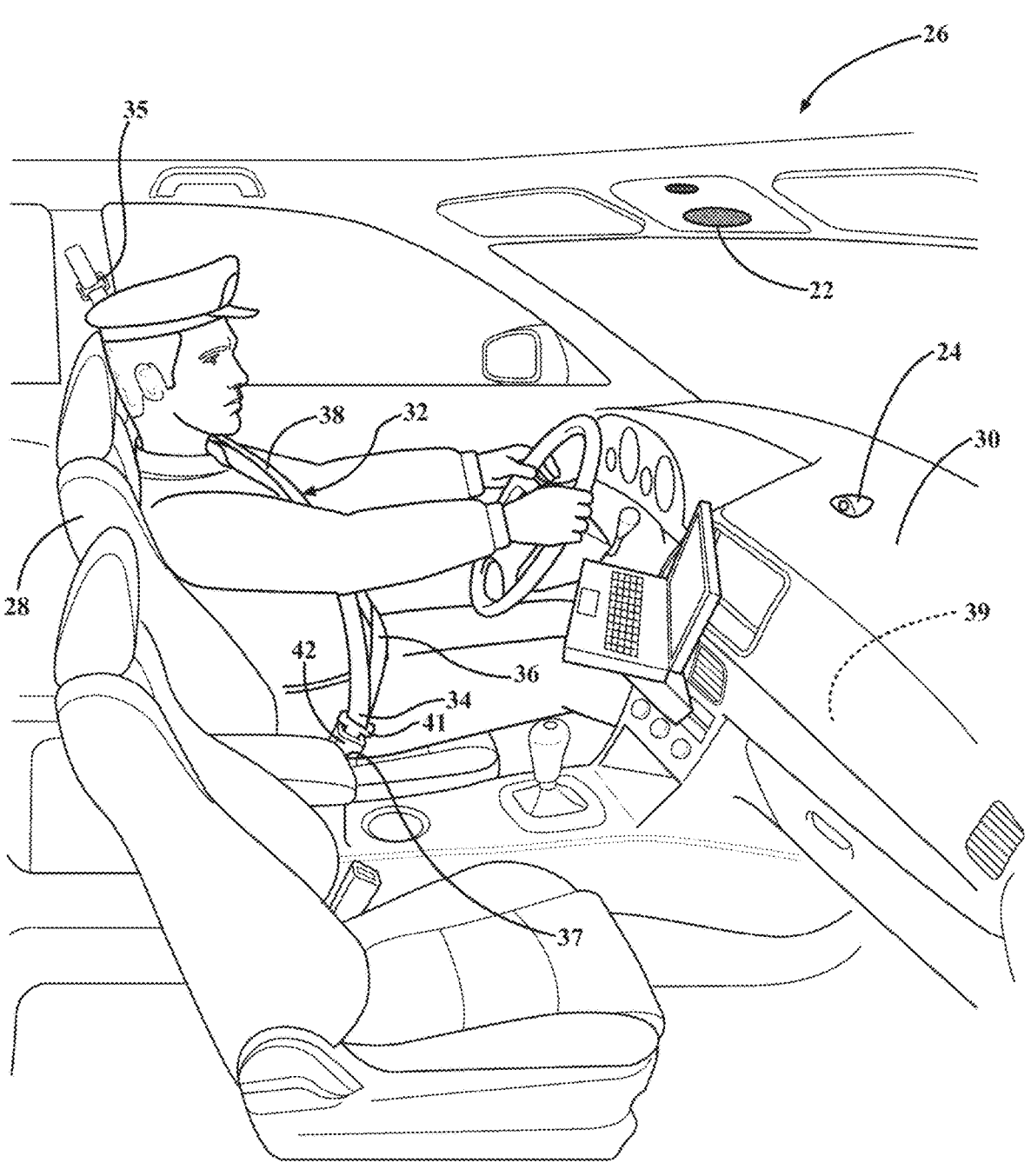
FIG. 3 is a perspective view of a vehicle cabin of the vehicle of FIG. 1.

Referring now to the example shown in FIGS. 1-3, a vehicle system 100 is illustrated. The vehicle system 100 includes a vehicle processor 200 and a server 300 in communication with the vehicle processor 200. In the example shown in FIG. 1, the vehicle system 100 is incorporated into a vehicle 10. The vehicle 10 may be an electric vehicle 10 (EV) such that the vehicle 10 includes a battery 18 and may include autonomous or semi-autonomous capabilities. Alternatively, the vehicle 10 may include an internal combustion engine (ICE). Additionally, the vehicle 10 may be a hybrid electric vehicle (HEV) incorporating both EV and ICE components and capabilities.

Referring still to FIG. 1, the vehicle 10 includes an engine 20 which, as described above, may be an ICE or an electric motor. The vehicle 10 also includes a plurality of vehicle doors 12 for allowing exit and entrance of a vehicle driver and/or passengers and includes a front windshield 14 and a rear windshield (not shown). The vehicle 10 may be an emergency vehicle such as a police vehicle, an ambulance, or other emergency vehicle such that the vehicle 10 includes one or more of emergency lights and/or sirens 16. In the example shown, the emergency lights and sirens 16 are disposed on a roof of the vehicle 10. However, the emergency lights and/or sirens 16 may be disposed in an interior of the vehicle 10 adjacent to the front or rear windshield 14 or at other external locations such as on a trunk portion or a hood portion of the vehicle 10. Additionally, the vehicle 10 includes one or more vehicle sensors 22. The vehicle sensors 22 may be any type and quantity of sensors and may be able to provide information related to the vehicle 10 or its surroundings to the vehicle processor 200.

As best shown in FIG. 1, the vehicle 10 also includes the vehicle camera 24. The vehicle camera 24 may be any type of vehicle camera including, but not limited to, an interior camera, a rear camera, a front camera, a side camera, and/or a perimeter camera. The vehicle camera 24 may be one or more of a monocular camera, a binocular camera, a wide-angle camera, or the like. In some examples, the vehicle camera 24 includes a plurality of cameras 24 that include the same type of camera or a plurality of different types of cameras disposed at various locations about the vehicle 10. Regardless of the number, types, and locations of the vehicle cameras 24, the vehicle cameras 24 may be configured to record and/or transmit video data to the vehicle processor 200 and/or the server 300. The video data may include video data of an interior 26 of the vehicle 10 and/or video data of an area external to the vehicle 10.

As best shown in FIG. 2, the vehicle 10 may include defensive features such as a shield 40, which adds additional protection to the front windshield 14 or to the rear wind-shield and/or a nudge bar 44 configured to allow the vehicle 10 to be used as a battering ram for simple structures or fences, or to push other vehicles. Further, the vehicle 10 may include a suspension 11, which is configured to be moved between a lowered position (see FIG. 1) and a raised position (see FIG. 2). The lowered position allows the vehicle passenger or driver to easily exit the vehicle as the vehicle 10 is disposed closer to the ground. Alternatively, the raised position provides a better viewpoint for the vehicle driver and may mitigate impact from another vehicle or object during a vehicle crash.

As best shown in FIG. 3, the vehicle 10 includes the interior 26, which may include one or more vehicle seats 28 configured to have a driver or passenger seated thereon. The vehicle interior 26 may also include a dashboard 30 having a display to display information to the driver and/or passengers. Additionally, the vehicle 10 may include one or more seatbelt assemblies 32 disposed in the vehicle interior 26. The seatbelt assemblies 32 include a seatbelt 34 comprised of a webbed polyester material, a retractor 35, and a pre-tensioner 37. The seatbelt 34 is configured to secure a vehicle passenger and spread impact forces across the vehicle passenger's body. Additionally, the seatbelt 34 is movable between an unbuckled position and a buckled position. The seatbelt 34 may be a two-point seatbelt, a three-point seatbelt, or a five-point seat belt. In the example where the seatbelt 34 is a three-point seatbelt, the seatbelt 34 includes a lap portion 36 configured to be disposed over the vehicle passenger's lap when the seatbelt 34 is in the buckled position, a shoulder portion 38 configured to be disposed over the vehicle passenger's shoulder in the buck-led position, and a tongue portion 41 configured to be inserted into a buckle 42 in the buckled position. The buckle 42 also includes at least one user-activated button to release the seatbelt 34 from the buckled position.

Moreover, the seatbelt 34 must have a length that allows for the seatbelt to secure various-sized passengers. To facilitate various-sized passengers, the retractor 35 is coupled to the seatbelt 34 and is configured to allow the seatbelt 34 to extend to a desired length. Further, the pre-tensioner 37 is configured to retract some of the length of the seatbelt 34 the instant a collision occurs. Retraction of the seatbelt 34 restrains occupants quickly and reduces forward movement of the occupants in a frontal impact. Additionally, the retraction of the seatbelt 34 length by the pre-tensioner 37 secures the vehicle passenger in a proper position for additional safety features such as airbags 39. The pre-tensioner 37 may be an electronic tensioner, a mechanical tensioner, or a combination electric-mechanical tensioner and may be located proximate to a base of the buckle 42, as shown in FIG. 3.

The vehicle system 100 also includes the vehicle proces-sor 200 configured to store vehicle data 202 including one or more of vehicle location data 204, vehicle event data 206, and vehicle mode data 208. The vehicle processor 200 includes memory hardware 201 and processing hardware 203, where the memory hardware 201 stores the foregoing data 204, 206, 208 as well as instructions for execution by the data processing hardware 203. For example, the operations set forth in FIG. 4 may be stored by the memory hardware 203 and may be executed by the processing hardware 203, as will be described in greater detail below. The vehicle location 204 generally pertains to a location of the vehicle 10. The vehicle location 204 may be obtained from a Global Positioning System (GPS), other navigation system, a user device such as a cellular phone or tablet, and/or a third-party application or processor 500. Regardless of how the vehicle location 204 is obtained, this information may be communicated to the vehicle processor 200. More-over, the vehicle location data 204 may include route data such that a route the vehicle 10 is traveling, including origin and destination information, may also be communicated to the vehicle processor 200.

The vehicle event data 206 generally pertains to data related to the vehicle 10 or its surroundings. The vehicle event data 206 may include data related to the vehicle battery 18, the vehicle engine 20, the vehicle doors 12, the seatbelt assemblies 32, or other vehicle features. Additionally, the vehicle event data 206 may include one or more of whether police sirens 16 or emergency lights are activated (i.e., in an ON state), driving conditions of the vehicle 10 including whether the vehicle 10 is being driven normally or aggressively (i.e., is in pursuit of a suspect; a so-called "chase scenario"), time-of-day, suspect information, pedes-trian information, suspect location, weapon status, and impact detection data. The data related to whether the police emergency lights or sirens 16 are activated may include data from the vehicle sensors 22 or a vehicle microphone 23 located within the vehicle interior 26, which may indicate a traffic stop, vehicle chase, or other emergency situation. The data related to the driving conditions (i.e., normal or chase scenario) may be based on a user input such that the driver or passenger selects or otherwise advises the vehicle pro-cessor 200 of whether the current situation may be a routine situation or a more dangerous situation such as a chase scenario. The data related to the driving conditions may also include one or more of vehicle speed, acceleration, steering wheel location, and vehicle surroundings such as traffic or other road blockages. Additionally, the data related to the driving conditions may include data from the vehicle camera 24 related to a suspect's vehicle and/or the suspect.

The data related to time-of-day may include standardized time and time zone along with sunrise, sunset, or other weather information related to visibility. Additionally, the data related to time-of-day may include data from the vehicle camera 24 related to time-of-day or visibility infor-mation. Moreover, the data related to the suspect's infor-mation may generally pertain to any information related to the suspect including, but not limited to, the suspect's name, age, biometric information, criminal history, and/or vehicle. The data related to the suspect's information may be gath-ered from the third-party processor 500 and/or may be accessed through a suspect database, or may be gathered using the vehicle camera 24. Additionally, the data related to pedestrian information generally pertains to information related to any nearby pedestrians, which may include locations and movements of pedestrians nearby. The pedestrian data may be gathered using the vehicle camera 24 and/or sensors 22.

The data related to the suspect's location generally pertains to a past, current, or predicted future location of the suspect and/or the suspect's vehicle. The data related to the suspect location may include data gathered from the vehicle camera 24 and/or sensors 22, may be gathered from the third-party processor 500 such as a nearby user device, or data from other vehicles along the route. Additionally, the data related to the weapon status generally pertains to data related to whether the suspect has or is likely to have a weapon. The data may be gathered through the vehicle camera 24 or may be gathered from the third-party processor 500. For example, the third-party processor 500 may obtain information about the suspect from other vehicle cameras of vehicles along the route or from police databases such as past criminal data or current information from emergency dispatchers or other police resources.

The impact detection data generally pertains to data relating to whether the vehicle 10 has been in an impact event. For example, the impact detection data may include vehicle speed, vehicle acceleration, vehicle location, and the like. Additionally, the impact detection data may include data relating to whether an impact is imminent and the location of the impact with respect to the vehicle 10. More specifically, the impact detection data may include data gathered from vehicle cameras 24 or sensors 22 inside or outside of the vehicle 10. For example, the impact detection data may include data indicating that the vehicle 10 has exited the road which, in turn, may be indicative that the vehicle 10 has been involved in a crash. Such data can be verified by one or more vehicle cameras 24, for example, if the cameras 24 detect damage to the vehicle 10 and/or contact with another vehicle. The vehicle processor 200 may capture additional data related to the vehicle 10 exiting the road such as whether the vehicle 10 has returned to the road, has been off of the road for an extended period-of-time, or is in a location that could prevent the vehicle 10 from returning to the road (i.e., is near or in a body of water).

Additionally, the vehicle mode data 208 includes the mode of the vehicle 10. For example, the vehicle mode data may include whether the vehicle 10 is operating in drive, neutral, reverse, park, or another mode.

Referring again to FIGS. 1-4, the server 300 is configured as a network and/or a cloud-based system that communicates with the vehicle processor 200. In some examples, the server 300 is also configured to communicate with third-party processors 500 to collect third-party data. For example, the third-party processors 500 may include, but are not limited to, vehicle processors 200 along the route input via a user device (i.e., a cellular phone or tablet) or an in-vehicle navigation system. Additionally or alternatively, the third-party processors 500 may include third-party databases accessible by emergency personnel including, but not limited to, Relational Database Management System (RDBMS), National Crime Information Center (NCIC), warrant databases, and other databases related to criminal history or current suspect data. It is generally contemplated that the third-party data may include vehicle data 202 including vehicle location data 204, vehicle event data 206, and/or vehicle mode data 208 from the third-party processors 500. Moreover, it is also contemplated that the vehicle processor 200 may communicate any or all of the vehicle data 202 to the server 300 for further processing and/or evaluation. The vehicle processor 200 and/or the server 300 may continuously and/or regularly update such that the vehicle data 202 is updated in real time.

Additionally, the server 300 is configured to determine whether a safety threshold has been exceeded based on one or more of the vehicle event data and the vehicle mode data. The server 300 may use weighted vehicle event data 206 and/or vehicle mode data 208 to determine a dynamic safety threshold based on the contextual information from the vehicle event data 206 and the vehicle mode data 208. For example, the server 300 may determine that the safety threshold is higher during the day and during a routine traffic stop than a safety threshold at night and during a chase situation.

Further, the server 300 may use additional contextual information from the vehicle sensors 22 and/or the vehicle cameras 24 to determine occupant and suspect intents and capabilities (i.e., gun drawn, handcuffed, aggressive approach, weapon detected, other vehicle moving when it shouldn't be, other third parties arriving, number of emergency responders on scene). This additional contextual information may be used by the server 300 to determine whether the safety threshold has been exceeded. For example, the server 300 may use data from the vehicle camera 24 indicating the suspect has exited their vehicle and is heading towards the vehicle 10 to determine that the safety threshold has been exceeded.

Additionally, the server 300 may be configured to activate a defense mode if it is determined that the safety threshold has been exceeded. The defense mode may include one or more of the following defense categories: preemptive defense, expedited exit, stationary defense, and dynamic defense. For example, the preemptive defense category may include preventive defense actions. The preemptive defense category actions may include one or more of adjusting one or more seatbelt assembly 32 such as deactivating the pre-tensioner 37 of the seatbelt assembly 32 to allow full motion of the vehicle passenger, projecting the surroundings of the vehicle 10 from the vehicle camera 24 onto the display of the dashboard 30 to allow for closer observation by the driver and/or passenger, and/or deploying any armor included with vehicle 10 including, but not limited to, activating the shield 40 or moving the suspension 11 of the vehicle 10 between raised and lowered positions.

Additionally, the expedited exit category may include measures to allow the driver and/or passenger to exit the vehicle 10 as quickly as possible. The expedited exit category actions may include one or more of unbuckling the seatbelt 34, unlatching and/or opening the vehicle door 12, moving the vehicle 10 to the lowered position to help facilitate exit, projecting the surroundings of the vehicle 10 from the vehicle camera 24 onto the display of the dashboard 30 to allow for closer observation by the driver and/or passenger prior to or during exit, and/or deploying any armor included with vehicle 10 including, but not limited to, activating the shield 40.

For example, if the server 300 determines that the safety threshold has been exceeded with the vehicle 10 in park due to the driver and/or passenger being detected in the vehicle 10 via the vehicle sensors 22 and/or vehicle cameras 24, the police sirens 16 are activated or a traffic stop is being initiated, and a door handle inside the vehicle 10 is pulled open, then the server 300 may implement the defense mode, such as an expedited exit. The expedited exit defense mode may include automatically unlatching the seatbelt 34 and lowering the suspension 11 of the vehicle 10 to the lowered position. Additionally, the server 300 may also automatically open one or more of the vehicle doors 12 and/or the vehicle trunk to assist the driver and/or passenger in swiftly exiting the vehicle 10.

Moreover, the stationary defense category may include actions to prepare for immediate defense when the vehicle 10 is in park. The stationary defense category actions may include one or more of engaging the pre-tensioner 37 of the seatbelt assembly 32 to prepare for impact, deploying armor such as the shield 40 or one or more airbags 39 of the vehicle 10, autonomously retreating or repositioning the vehicle 10, closing and/or locking all vehicle doors 12 including the vehicle trunk to prepare for impact, preparing the vehicle battery 18 for thermal discharge, cutting off a fuel source, stopping the vehicle engine 20, deploying flairs or other safety equipment, and/or sealing and cleaning air within the vehicle interior 26.

For example, if the server 300 determines that the safety threshold has been exceeded as a suspect is exiting their vehicle after a chase situation, the server 300 may deploy armor, such as the shield 40, as well as secure all vehicle doors 12, and immediately display images and/or videos captured by the vehicle camera 24 on the dashboard 30, which may include the approaching suspect. Further, if the suspect is determined to be carrying a weapon or is otherwise determined to be immediately dangerous to the vehicle driver and/or passenger, the server 300 may activate autonomous retreat such that the vehicle 10 automatically retreats to a safer location.

Additionally, the dynamic defense category may include actions to prepare for immediate defense when the vehicle 10 is moving. The dynamic defense category actions may include one or more of deploying armor such as the shield 40 or various airbags 39 of the vehicle 10, executing an evasive maneuver, autonomously retreating, rerouting, or repositioning of the vehicle 10, and/or sealing the vehicle interior 26 and/or supplying clean air to the vehicle interior 26.

For example, the server 300 may determine the safety threshold is exceed because the vehicle 10 is in drive or reverse, and through data from the vehicle sensors 22 or vehicle cameras 24, determines that imminent impact is likely. Then, the server 300 may activate the defense mode including the dynamic defense category such that the battery 18 is prepared for thermal discharge and the armor such as the shield 40 or various airbags 39 may be deployed to protect the vehicle passenger and/or driver from impact.

Additionally, the server 300 may be configured to prompt the vehicle driver and/or passenger prior to activating the defense mode. Further, the server 300 may be configured to store and update a user profile, which may include preferences selected by the user. These preferences may affect the dynamic safety threshold. For example, the user profile may contain information on how often to suggest and/or deploy each of the defense mode actions. As such, a user may elect to deploy the seatbelt 34 unbuckling or unlatching action every time the user unlatches the door 12 during a routine traffic stop. In another example, the user profile may indicate that the shield 40 should be activated at a higher safety threshold than displaying data from the vehicle camera 24 on the dashboard 30.

It should be noted that while the server 300 is described as performing the foregoing functions as well as the functions set forth below with respect to FIG. 4, the vehicle processor 200 including the memory hardware 201 and the processing hardware 203 could alternatively perform these functions independently from or in conjunction with the server 300. Further, while not specifically shown or described, the server 300 likewise includes memory hardware and processing hardware in a similar fashion as the vehicle processor 200.

Figure 4:
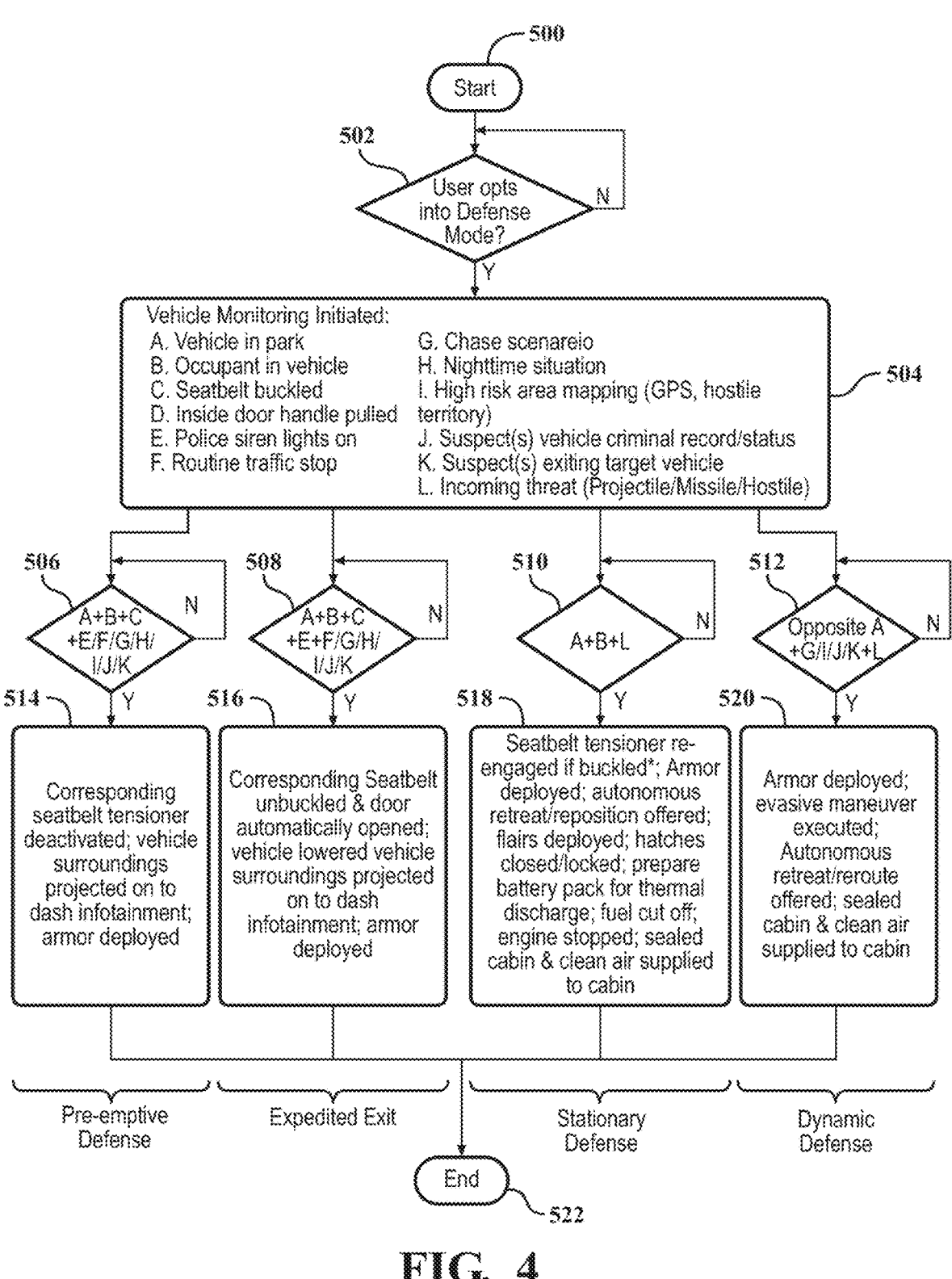
FIG. 4 is a flow chart detailing operation of the vehicle system according to the present disclosure.

Referring now to the example shown in FIG. 4, in operation, the vehicle 10 starts at step 500 and the user may opt into the defense mode at step 502. If the user does opt into the defense mode, the vehicle processor 200 begins monitoring various inputs at step 504. The inputs include one or more of vehicle mode, whether an occupant is in the vehicle, the seatbelt 34 position, the door handle status, the police sirens 16 status, whether this is a routine traffic stop or a chase scenario, time-of-day such as a nighttime situation, location information such as a high-risk area, suspect information including the suspect's vehicle and criminal record, suspect's location such as whether the suspect is exiting their vehicle, or whether there is an incoming threat such as an incoming hostile suspect or object. If it is determined, based on the inputs, that the safety threshold has been exceeded, the server 300 will enter the defense mode and take appropriate action. For example, if the vehicle 10 is in park, the occupant is in the vehicle, the seatbelt 34 is buckled, and one or more of the police sirens 16 and/or emergency lights are activated (i.e., ON), it's a routine traffic stop but it's a nighttime situation, it's a high-risk area, the suspect has a dangerous criminal record, or the suspect is exiting the vehicle at step 506, the server 300 may activate the defense mode by taking preemptive defense actions at step 514. The preemptive defensive actions may include one or more of de-activating the pre-tensioner 37 of the seatbelt assembly 32, projecting the vehicle surroundings from the vehicle camera 24 onto the display of the dashboard 30, and deploying armor such as the shield 40.

In another example, if the vehicle 10 is in park, the driver or vehicle passenger is in the vehicle 10, the seatbelt 32 is buckled, one or more of the police sirens 16 and/or emergency lights are activated (i.e., ON), it's a routine traffic stop or it's a chase scenario, it's a nighttime situation, it's a high-risk area, the suspect has a dangerous criminal record, or the suspect is exiting the vehicle at step 508, the server 300 may determine that the safety threshold has been exceeded and, thus, activate the defense mode. Further, the server 300 may determine that the defense mode should be activated and take expedited exit actions at step 516. The expedited actions may include unbuckling the seatbelt 32, opening one or more vehicle doors 12, moving the vehicle 10 to the lowered position, projecting the vehicle surroundings from the vehicle camera 24 onto the display of the dashboard 30, and deploying armor such as the shield 40.

In another example, if the vehicle 10 is in park, the vehicle driver or passenger is in the vehicle 10 and there is an incoming threat such as a vehicle impact at step 510, the server 300 may activate the defense mode and take stationary defense actions at step 518. The stationary defense actions may include one or more of engaging the pre-tensioner 37 of the seatbelt assembly 34, deploying armor such as the shield 40, autonomously retreating or repositioning the vehicle 10, deploying flairs, closing and/or locking one or more vehicle doors 12, preparing the vehicle battery 18 for thermal discharge, cutting off a fuel source, stopping the vehicle engine 20, and/or sealing the vehicle interior 26 and beginning to supply clean air to the vehicle interior 26.

In another example, if the vehicle 10 is not in park, and it is determined that the vehicle 10 is in a chase scenario, or a high-risk area, or the suspect has a criminal record, or the suspect is exiting a vehicle and hastily approaching the vehicle 10 at step 512, the server 300 may activate the defense mode and take dynamic defense actions at step 520. The dynamic defense actions may include, but are not limited to, deploying armor such as the shield 40, taking an evasive maneuver, autonomously retreating or rerouting the vehicle 10, and/or sealing the vehicle interior 26 and beginning to supply the vehicle interior 26 with clean air.

The vehicle system 100 as described herein addresses the problem of threat identification and/or threat mitigation through the use of the vehicle system 100 to prepare for a threat, identify possible threats, and shield the user from such threats.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle system for a vehicle, the vehicle system comprising:
   memory hardware in communication with data processing hardware, the memory hardware storing instructions that when executed on the data processing hardware cause the data processing hardware to perform operations comprising:
   determining whether the vehicle is in park;
   determining whether an occupant is in the vehicle;
   determining whether a seatbelt of the vehicle is buckled;
   determining whether there is a potential external threat to the vehicle or its occupants via one or more outward-facing sensors; and
   if the vehicle is in park, an occupant is in the vehicle, the seatbelt is buckled, and there is a potential external threat to the vehicle or its occupants, activating defensive measures comprising deploying physical protective measures, the defensive measures including deploying armor by positioning a shield over an exterior portion of the vehicle.

2. The vehicle system of claim 1, wherein the defensive measures further include deactivating a seatbelt pre-tensioner or projecting vehicle surroundings on a display within the vehicle.

3. The vehicle system of claim 2, wherein projecting vehicle surroundings on the display includes displaying images and/or video from one or more cameras associated with the vehicle.

4. The vehicle system of claim 2, wherein deploying the armor further includes deploying one or more airbags of the vehicle.

5. The vehicle system of claim 1, wherein determining whether there is a potential external threat to the vehicle includes determining whether a siren and/or emergency lights of the vehicle are activated.

6. The vehicle system of claim 1, wherein determining whether there is a potential external threat to the vehicle includes determining whether the vehicle is in a high-risk area.

7. The vehicle system of claim 1, wherein determining whether there is a potential external threat to the vehicle includes determining whether it is nighttime.

8. The vehicle system of claim 1, wherein determining whether there is a potential external threat to the vehicle includes determining whether a suspect is approaching the vehicle or whether a suspect has a criminal record.

9. A vehicle incorporating the vehicle system of claim 1.

10. A vehicle system for a vehicle, the vehicle system comprising:
    memory hardware in communication with data processing hardware, the memory hardware storing instructions that when executed on the data processing hardware cause the data processing hardware to perform operations comprising:
    determining whether the vehicle is in park;
    determining whether an occupant is in the vehicle;
    determining whether a seatbelt of the vehicle is buckled or is unbuckled;
    determining whether a siren and/or emergency lights of the vehicle are activated;
    determining whether there is a potential external threat to the vehicle or its occupants via one or more outward-facing sensors; and
    if the vehicle is in park, an occupant is in the vehicle, the seatbelt is buckled, the siren and/or emergency lights are activated, and there is a potential external threat to the vehicle or its occupants, activating expedited exit measures and activating defensive measures comprising deploying physical protective measures, the defensive measures including deploying armor by positioning a shield over an exterior portion of the vehicle.

11. The vehicle system of claim 10, wherein the expedited exit measures include unbuckling a seatbelt, projecting vehicle surroundings on a display within the vehicle, lowering the vehicle, and opening a vehicle door.

12. The vehicle system of claim 11, wherein projecting vehicle surroundings on the display includes displaying images and/or video from one or more cameras associated with the vehicle.

13. The vehicle system of claim 10, wherein determining whether there is a potential external threat to the vehicle includes determining whether the vehicle is in a high-risk area.

14. The vehicle system of claim 10, wherein determining whether there is a potential external threat to the vehicle includes determining whether it is nighttime.

15. The vehicle system of claim 10, wherein determining whether there is a potential external threat to the vehicle includes determining whether a suspect is approaching the vehicle or whether a suspect has a criminal record.

16. A vehicle incorporating the vehicle system of claim 10.

17. A vehicle system for a vehicle, the vehicle system comprising:
    memory hardware in communication with data processing hardware, the memory hardware storing instructions that when executed on the data processing hardware cause the data processing hardware to perform operations comprising:
    determining whether the vehicle is in drive or reverse;
    determining whether an occupant is in the vehicle;

determining whether there is an incoming external threat to the vehicle or its occupants via one or more outward-facing sensors; and if the vehicle is in drive or reverse, an occupant is in the vehicle, and there is an incoming external threat to the vehicle or its occupants, activating defensive measures comprising deploying physical protective measures, the defensive measures including deploying armor by positioning a shield over an exterior portion of the vehicle.

18. The vehicle system of claim 17, wherein the defensive measures further include sealing a cabin of the vehicle, supplying clean air to an interior cabin of the vehicle, and rerouting the vehicle.

19. The vehicle system of claim 17, wherein determining whether there is an incoming external threat to the vehicle includes determining whether a suspect is approaching the vehicle or whether a suspect has a criminal record.

20. A vehicle incorporating the vehicle system of claim 17.

\* \* \* \* \*